US009874268B2

(12) United States Patent
Moradell-Casellas et al.

(10) Patent No.: US 9,874,268 B2
(45) Date of Patent: Jan. 23, 2018

(54) ACTUATING ASSEMBLY FOR A THRUST REVERSER OF AN AIRCRAFT ENGINE

(71) Applicants: AIRCELLE, Gonfreville l'Orcher (FR); SAGEM DEFENSE SECURITE, Paris (FR)

(72) Inventors: Pierre Moradell-Casellas, Saint Georges des Groseillers (FR); Franck Delnaud, Paris (FR)

(73) Assignee: AIRCELLE, Gonfreville l'Orcher (FR)

( * ) Notice: Subject to any disclaimer, the term of this patent is extended or adjusted under 35 U.S.C. 154(b) by 783 days.

(21) Appl. No.: 14/133,327

(22) Filed: Dec. 18, 2013

(65) Prior Publication Data

US 2014/0234089 A1    Aug. 21, 2014

Related U.S. Application Data

(63) Continuation of application No. PCT/FR2012/051312, filed on Jun. 12, 2012.

(30) Foreign Application Priority Data

Jun. 20, 2011 (FR) ..................... 11 55402

(51) Int. Cl.
*F16H 25/22* (2006.01)
*F02K 1/76* (2006.01)
(Continued)

(52) U.S. Cl.
CPC ........... *F16H 25/2204* (2013.01); *F02K 1/56* (2013.01); *F02K 1/76* (2013.01); *F02K 1/763* (2013.01);
(Continued)

(58) Field of Classification Search
CPC ............. F02K 1/76; F02K 1/763; F02K 1/766
See application file for complete search history.

(56) References Cited

U.S. PATENT DOCUMENTS

| 4,586,329 A | 5/1986 | Carlin |
| 6,487,846 B1 | 12/2002 | Chakkera et al. |
| 2012/0037723 A1* | 2/2012 | Moradell-Casellas .. F02K 1/763 239/265.19 |

FOREIGN PATENT DOCUMENTS

| GB | 2 319 810 A | 6/1998 |
| WO | 2004/113707 A1 | 12/2004 |
| WO | 2010/122253 A1 | 10/2010 |

OTHER PUBLICATIONS

International Search Report issued in International Application No. PCT/FR2012/051312.

* cited by examiner

*Primary Examiner* — Craig Kim
(74) *Attorney, Agent, or Firm* — Burris Law, PLLC

(57) ABSTRACT

An actuating assembly for an aircraft engine thrust reverser includes a drive shaft bearing a master pinion; a ball screw bearing a slave pinion engaging with the master pinion; a nut capable of translating over the ball screw as a result of the rotation of the ball screw; an extension tube rigidly secured to the nut and a lock assembly to block the rotation of the drive shaft in a so-called direct jet position of the reverser. The extension tube includes, at its free end, a member for connecting to a portion of the reverser prior to being actuated. In particular, the lock assembly includes an abutment secured to the drive shaft, and a cotter moveable between a locking position and an unlocking position. The reduction ratio (R) between the slave and master pinions is even.

6 Claims, 2 Drawing Sheets

(51) Int. Cl.
*F16H 25/24* (2006.01)
*F02K 1/56* (2006.01)
*F16H 25/20* (2006.01)

(52) U.S. Cl.
CPC ......... *F02K 1/766* (2013.01); *F16H 25/2454* (2013.01); *F16H 2025/2084* (2013.01); *Y02T 50/671* (2013.01); *Y10T 74/18704* (2015.01)

ACTUATING ASSEMBLY FOR A THRUST REVERSER OF AN AIRCRAFT ENGINE

CROSS-REFERENCE TO RELATED APPLICATIONS

This application is a continuation of International Application No. PCT/FR2012/051312, filed on Jun. 12, 2012, which claims the benefit of FR 11/55402, filed on Jun. 20, 2011. The disclosures of the above applications are incorporated herein by reference.

FIELD

The present disclosure relates to an actuating assembly for a thrust reverser of an aircraft engine.

BACKGROUND

The statements in this section merely provide background information related to the present disclosure and may not constitute prior art.

An aircraft is driven by several turbojet engines each housed in a nacelle channeling the air flows generated by the turbojet engine, this nacelle generally housing a mechanical thrust reversal system.

The role of a thrust reverser, upon touchdown of an aircraft, is to improve the braking ability of the aircraft by redirecting forward at least a portion of the thrust generated by the turbojet engine, which adds to the wheel braking of the aircraft.

The means implemented to achieve this cold flow redirection vary depending on the type of reverser. However, in all cases, the structure of a reverser comprises mobile cowls movable between a so-called "direct jet" or closed position, wherein they close this passage and a so-called "reverse jet" or open position, wherein they open a passage for the diverted flow within the nacelle.

In the case of a grid-type thrust reverser for example, also known as cascade thrust reverser, redirecting the air flow is performed by cascades, the mobile cowl having a mere sliding function to cover or uncover these grids.

The translation of the mobile cowl is carried out along a longitudinal axis substantially parallel to the axis of the nacelle. Thrust reversal flaps, actuated by the sliding of the cowl, make it possible to block the cold flow stream downstream of the cascades, such as to optimize the redirection of the cold flow to the outside of the nacelle.

Moving such a mobile cowl is commonly obtained by means of mechanical actuators such as that disclosed in application PCT/US2004/019260, and which has been represented in FIG. 1 attached.

It is worth noting that such an actuator can be either hydraulically (hydraulic-mechanical actuator) or electrically (electrical-mechanical actuator) powered.

Such a mechanical actuator comprises a worm drive 1 whereon a nut 3 is screwed, the latter being secured to an extension tube 5 with an eyelet 7 at its free end.

In one form, balls 8 are interposed between the threads of the screw 1 and those of the nut 3 such as to reduce friction, thus, this type of actuator is commonly referred to as "ball screw".

The screw 1 comprises at the end opposite to that of the eyelet 7, a pinion 9 with conical teeth cooperating with a master pinion 11 the latter being directly or indirectly driven by rotational drive means such as an electric motor.

Under the action of this electric motor, the screw 1 may be swiveled in one direction or the other, and thus translate the nut 3 in one direction or the other, hence, extending or retracting the tube 5.

These movements of the tube 5 make it possible, by means of its eyelet 7, to act on the movable member of the nacelle such as a mobile cowl of grid-type thrust reverser (considering that there are usually several actuators of this type to move such a mobile cowl).

More specifically, as is visible in FIG. 2, the eyelet 7 cooperates with a clevis 15 secured to the mobile cowl of the thrust reverser (not represented), this eyelet being connected to this clevis by a bolted screw 17.

In order to prevent an untimely deployment of the mobile cowl of the thrust reverser, safety locking means are typically provided, which must be deactivated prior to any thrust reversal operation.

These locking means particularly comprise primary locking means, commonly designated as PLS (Primary Locking System).

This PLS system, represented generically by box 19 on FIG. 1, comprises a locking rod capable of blocking the rotation of the drive shaft 12 of the master pinion 11, it is worth noting herein that the drive shaft itself is driven in rotation by flexible transmission shafts commonly called Flexshafts.

Such a PLS system is known for example from document U.S. Pat. No. 4,586,329, or from document U.S. Pat. No. 6,487,846.

As is visible in each of the devices disclosed in these documents, the design of the PLS system is complex: at its end the locking rod comprises a locking bar, pivotally and slidingly mounted on this finger, the ends of this locking bar being capable of cooperating with two abutments arranged at 180° on the drive shaft of the master pinion.

SUMMARY

The present disclosure provides an actuating assembly for a thrust reverser of an aircraft engine comprising:
  a drive shaft bearing a master pinion,
  a ball screw bearing a slave pinion engaging with said master pinion,
  a nut capable of translating over the ball screw as a result of the rotation thereof,
  an extension tube secured to said nut and comprising, at the free end thereof, a connecting member for connection to a portion of said reverser to be actuated, and
  locking means for blocking the rotation of said drive shaft, capable of immobilizing said portion in a so-called "direct jet" position of the reverser, characterized in that said locking means comprise a unique abutment secured to said drive shaft, and a cotter movable between a locking position, wherein it prevents the rotation of said abutment and an unlocking position, wherein it allows the rotation,
  and in that the reduction ratio between said slave and master pinions is even.

Thanks to these features, and provided that one departs from a reference position of closed actuator or on its PLS wherein the cotter abuts against the unique abutment of the drive shaft, pivoting the drive tube modulo 180° will result in systematically replacing the drive shaft abutment back to the same position upon return to the reference position of the actuator.

According to the present disclosure, such pivoting may especially occur during the mounting operations of the drive assembly on a thrust reverser: in fact, during these operations, the operator may need to make the free end of the extension tube swivel modulo 180°, often materialized by a fastening eyelet, to make it cooperate with the corresponding portion of the reverser to be actuated, as will the following detailed description particularly show.

Thus, in particular, departing from an actuating assembly that has been placed in a so-called reference configuration wherein the locking cotter abuts against the unique abutment of the drive shaft, once the actuating assembly mounted on the reverser and repositioned in the reference position, this same reference position will be returned to in any case.

In this way, the presence of a unique abutment on the drive shaft is sufficient: in fact, there is no risk of this abutment being misplaced with respect to the locking cotter when the reverser is in the closed ("direct jet") position at the end of the mounting operations, and thus preventing the actual relocking of the blocking means.

One may, in this way, carry out an adjustment of the abutment position of the drive shaft with respect to the locking cotter, contrary to the prior art wherein the selected means for limiting the risk of occurrence of an undesired opening stroke of the thrust reverser, was to provide two abutments arranged at 180° on the drive shaft, and a complex locking bar device pivotally and slidingly mounted on a translating locking finger.

According to other optional features of the present disclosure:
  the features of said actuating assembly are selected such that the locking of said abutment by said cotter is effective including when the portion of said reverser to be actuated is set apart from its "direct jet" position by a predetermined distance: this feature particularly allows for an effective locking despite the different dimensional tolerances involved, and possible desynchronizations of the actuating assemblies acting together on said reverser portion;
  said features are selected such that said distance is of the magnitude of 2 millimeters: this value corresponding to what is required by good practice;
  said features are selected such that: $(J/P)*R<(1-X)$, where:
    J is the aforementioned distance,
    P is the pitch of the ball screw,
    R is the reduction ratio between said slave pinion and said master pinion, and
    X is a positive real number within the interval [0, 1], representing the ratio between the cumulative circumferential length of said abutment and said cotter, and the length of the associated total circumference.

This last formula enables to know if, for given values of distance J, ball screw pitch P and reduction ratio R, there is sufficient circumferential length for placing the cotter and abutment, considering the constraints of mechanical resistance required for these parts.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
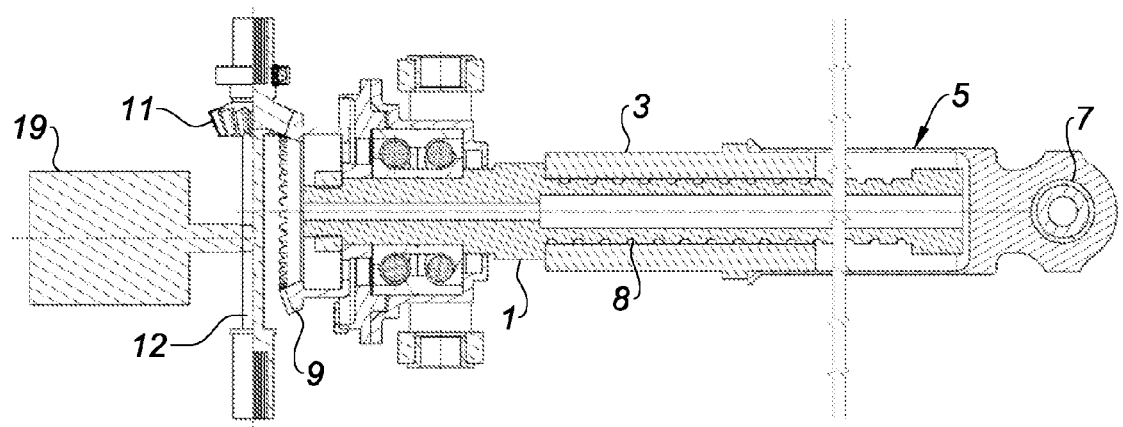
FIG. 1 is a longitudinal cross-sectional view of an actuating assembly for a turbojet engine thrust reverser described in the preamble of the present description.
Figure 2:
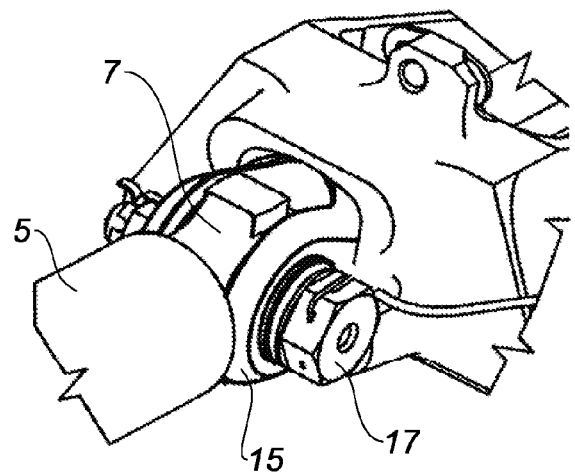
FIG. 2 is a perspective view of the connecting area of the free end of the assembly of FIG. 1 with the corresponding portion of the thrust reverser, such as described in the preamble of the present description.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

On all of these figures, identical or similar references designate identical or similar members or assemblies of members.

In what follows, to illustrate the idea, it will be assumed that the thrust reverser to be actuated is of the grid-type, and that the portion to be moved is therefore a mobile cowl capable of covering or uncovering these grids, depending on whether it is in the closed ("direct jet") or open ("reverse jet") position.

Figure 3:
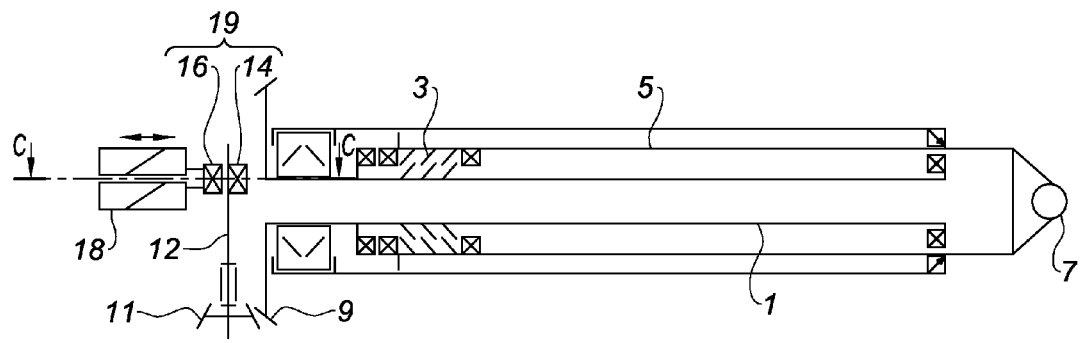
FIG. 3 is a schematic longitudinal cross-sectional view of an actuating assembly according to the present disclosure.

As can be seen from FIG. 3, the actuating assembly according to the present disclosure comprises, just as the actuating assembly of the prior art represented in FIG. 1:
  a worm drive 1,
  a nut 3 screwed onto this worm drive,
  an extension tube 5 secured to this nut 3,
  an eyelet 7 fixed at the free end of this extension tube 5,
  a slave pinion 9 with conical teeth,
  a master pinion 11 also with oblique teeth engaging with the slave pinion 9,
  a drive shaft 12 whereon is mounted the master pinion 11, this drive shaft being liable to be driven in rotation by a flexshaft type flexible transmission shaft (not represented),
  a unique abutment 14 secured to the drive shaft 12,
  a cotter 16,
  an actuating member 18 such as a solenoid, capable of moving the cotter 16 between a locking position, wherein it prevents the rotation of the abutment 14, and an unlocking position, wherein it allows this rotation.

The unique abutment 14, the cotter 16 and the solenoid 18 form locking means 19.

The reduction ratio between the slave pinion 9 and the master pinion 11 is even, and for example equal to 2 or 4.

This means that the master pinion respectively carries out two or four times more turns than the slave pinion.

Figure 4A:
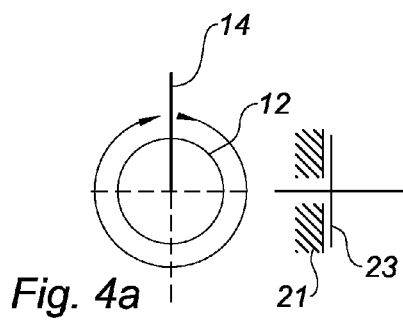
FIG. 4a is a detailed cross-sectional view, taken according to line C-C of FIG. 3, of the actuating assembly shown in this figure, when this actuating assembly is in the reference position.
Figure 4B:
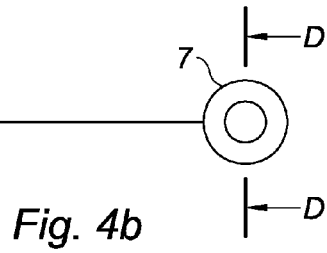
FIG. 4b is a simplified schematic view of the actuating assembly of FIG. 3, in its reference position.
Figure 4C:
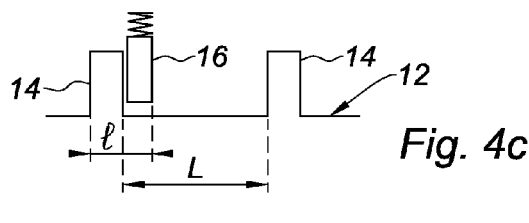
FIG. 4c is a developed view of FIG. 4a, emphasizing the respective positions of a cotter and a locking abutment of the actuating assembly according to the present disclosure.
Figure 4D:
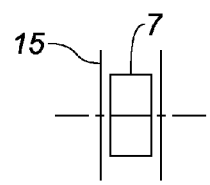
FIG. 4d is a cross-sectional view taken according to line D-D of FIG. 4b.

Before mounting the actuating assembly according to the present disclosure on the mobile cowl of the thrust reverser, it must be provided that when the extension tube 5 is in fully retracted position and that the eyelet 7 is correctly oriented with respect to the clevis 15 as indicated on FIG. 4d, the drive shaft 12 and the associated abutment 14 are in a well-determined reference position, represented in FIGS. 4a and 4c.

In this reference position, corresponding to the closed position of the actuating system, the cotter 16 is in the locked position.

Considering the even reduction ratio between the slave pinion 9 and the master pinion 11, it is certain that if the eyelet 7 and its associated extension tube 5 are swiveled by half a turn or more modulo 180° during the mounting operations of this eyelet from inside the yoke joint 15 associated with the mobile cowl of the thrust reverser, the abutment 14 will always reach the same position: in fact it will perform an integral number of turns for each half turn of the eyelet 7.

It is worth noting that, in operation, the rotational locking of the nut 3 is achieved by the eyelet 7.

Thus, particularly if one departs from the aforementioned reference position, it is certain that by making the eyelet 7 swivel in any one of these positions making it possible to cooperate with the yoke joint 15, the same reference position will always be reached wherein the abutment 14 is in contact with the cotter 16, thus ensuring the locking in rotation of the drive shaft 12, corresponding to a closed ("direct jet") position of the mobile cowl of the thrust reverser.

In this way, with an abutment 14 mounted on the drive shaft 12, it can be provided that despite the different manipulations which may occur during the mounting operations of the actuating device according to the present disclosure on the mobile cowl of the thrust reverser, this assembly will be in fine in its reference configuration wherein the mobile cowl is locked in the closed position.

Furthermore, the applicable good practices require that the locking device be effective from a position starting from the fully closed position of the mobile cowl in an interval of the magnitude of 2 mm.

This provides that the thrust reverser can be locked despite the different dimensional tolerances and assembling involved and the possible actuating synchronization differences of the other actuating assemblies acting on the mobile cowl.

Figure 5C:
FIGS. 5a, 5b and 5c are views respectively similar to FIGS. 4a, 4b and 4c, when the actuating assembly according to the present disclosure is in a position corresponding to a clearance of the portion of the thrust reverser to be actuated.
Figure 5A:
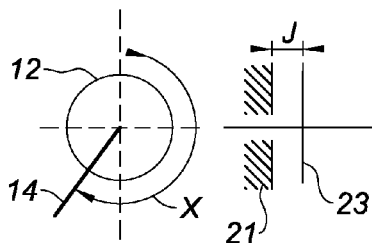
Figure 5B:
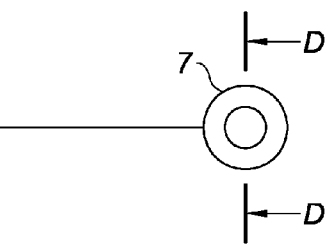

This distance J of 2 mm is represented schematically on FIG. 5b, this distance being placed between abutments 21 secured to the ball screw 1 and abutments 23 secured to the extension tube 5.

For a locking to be possible despite the existence of such a distance J, the cotter 16 can be positioned in the locked position, whatever the position taken by the abutment 14, corresponding to the different positions that can be taken by the extension tube 15 over the entire range of the distance J.

In order to achieve this result, the greatest circumferential length L separating the two sides of the abutment 14, reduced by the circumferential length l of the cotter 16, needs to allow for axial movement of the extension tube 5 by a value equal to the aforementioned distance J.

In practice, there are structural mechanical limitations pertaining to the resistance of the abutment 14 and cotter 16: as is visible on FIG. 5c, the cumulative circumferential length of the material formed by the abutment 14 and cotter 16 does not drop below a certain value.

In concrete terms, if X is set as the ratio between the cumulative circumferential length of the abutment 14 and the cotter 16 and the length of the associated total circumference, as is visible on FIG. 5c, it will be provided that the following relationship is verified:

$$(J/P)*R<(1-X)$$

where J is the aforementioned distance, P is the pitch of the ball screw, R is the reduction ratio between the slave pinion 9 and the master pinion, and X represents the aforementioned proportion.

This relationship makes it possible, based on known values for J, P and R, to know the permissible values for X.

Thus, for example, when choosing a distance of 2 mm, a pitch of 10 mm for the ball screw (meaning that the extension tube 5 moves by 10 mm for each full turn of the screw 1), and a reduction ratio of 4, it can be seen that $(J/P)*R$ is 0.8, such that the maximum value for X is 0.2.

If this value proves to be insufficient considering the resistance characteristics of the materials selected to form the abutment 14 and cotter 16, one may try to modify the reduction ratio, for example by bringing it to 2, thus allowing for a maximum value of 0.6 for X.

By an increase of the ball screw pitch, one may in the same manner increase the value of X for a same distance J.

As it will have been understood from the previous description, thanks to an appropriate reduction ratio and the positioning of the actuating assembly according to the present disclosure in a well determined reference position, one may provide in a very simple way a positive locking of the mobile cowl of the thrust reverser in the closed position, while in addition allowing for a slight clearance in accordance with the applicable good practices.

The present disclosure makes it possible to avoid the complex system of the prior art with several abutments and associated articulated locking arms.

This brings gains in weight, easy maintenance and cost.

Of course, the present disclosure is in no way limited to the described and represented forms.

Thus, for example, the guidelines outlined above could also be applied to a door-type thrust reverser.

What is claimed is:

1. An actuating assembly for an aircraft engine thrust reverser, comprising:
    a drive shaft bearing a master pinion;
    a ball screw bearing a slave pinion engaging with said master pinion;
    a nut translating over the ball screw as a result of the rotation thereof;
    an extension tube secured to said nut, the extension tube comprising, at a free end thereof, an eyelet for connecting to a clevis of said reverser to be actuated; and
    locking means for blocking a rotation of said drive shaft, capable of immobilizing said portion in a closed position of the reverser,
    wherein said locking means comprise an abutment secured to said drive shaft, and a cotter movable between a locking position in which it prevents a rotation of said abutment, and an unlocking position in which it allows the rotation of said abutment,
    wherein a reduction ratio (R) between said slave pinion and said master pinion is even, such that:
    when said extension tube is in a fully retracted position and said eyelet is correctly oriented with respect to said clevis, said drive shaft and said abutment are in a reference position in which said abutment is in contact with said cotter in locked position, and said abutment always reaches said reference position after a full or half rotation of said extension tube during maintenance operations.

2. The actuating assembly according to claim 1, wherein the locking of said abutment by said cotter is effective including when the portion of said reverser to be actuated is set apart from a direct jet position by a predetermined distance (J).

3. The actuating assembly according to claim 2, wherein said predetermined distance (J) is of the magnitude of 2 millimeters.

4. The actuating assembly according to claim 2, wherein features of said actuating assembly are selected such that:

$$(J/P)*R<(1-X),$$

where: J is the predetermined distance;
P is a pitch of the ball screw;
R is the reduction ratio between said slave pinion and said master pinion; and
X is a positive real number within the interval [0, 1], representing a ratio between a cumulative circumferential length of said abutment and said cotter, and the length of the associated total circumference.

5. A thrust reverser for a turbojet engine, wherein it comprises at least an actuating assembly in accordance with claim 1.

6. A nacelle for a turbojet engine, wherein it comprises a thrust reverser in accordance with claim 5.

* * * * *